(12) United States Patent
Goertz

(10) Patent No.: US 8,095,879 B2
(45) Date of Patent: Jan. 10, 2012

(54) USER INTERFACE FOR MOBILE HANDHELD COMPUTER UNIT

(75) Inventor: Magnus Goertz, Stockholm (SE)

(73) Assignee: Neonode Inc., Santa Clara, CA (US)

( * ) Notice: Subject to any disclaimer, the term of this patent is extended or adjusted under 35 U.S.C. 154(b) by 1228 days.

(21) Appl. No.: 10/315,250

(22) Filed: Dec. 10, 2002

(65) Prior Publication Data
US 2004/0109013 A1 Jun. 10, 2004

(51) Int. Cl.
G06F 3/00 (2006.01)

(52) U.S. Cl. ............... 715/716; 715/864; 715/702

(58) Field of Classification Search .......... 715/864, 715/702
See application file for complete search history.

(56) References Cited

U.S. PATENT DOCUMENTS

| | | | |
|---|---|---|---|
| 4,790,028 A | 12/1988 | Ramage | |
| 5,053,758 A * | 10/1991 | Cornett et al. | 345/174 |
| 5,283,558 A | 2/1994 | Chan | |
| 5,406,307 A * | 4/1995 | Hirayama et al. | 715/800 |
| 5,603,053 A * | 2/1997 | Gough et al. | 710/5 |
| 5,900,875 A * | 5/1999 | Haitani et al. | 715/840 |
| 5,956,030 A * | 9/1999 | Conrad et al. | 715/769 |
| 6,052,279 A * | 4/2000 | Friend et al. | 361/686 |
| 6,085,204 A * | 7/2000 | Chijiwa et al. | 715/246 |
| 6,346,935 B1 * | 2/2002 | Nakajima et al. | 345/173 |
| 6,542,191 B1 * | 4/2003 | Yonezawa | 348/333.01 |
| 6,597,345 B2 * | 7/2003 | Hirshberg | 345/168 |
| 6,639,584 B1 | 10/2003 | Li | |
| 6,727,917 B1 * | 4/2004 | Chew et al. | 715/765 |
| 6,734,883 B1 * | 5/2004 | Wynn et al. | 715/830 |
| 6,833,827 B2 * | 12/2004 | Lui et al. | 345/173 |
| 6,988,246 B2 * | 1/2006 | Kopitzke et al. | 715/810 |
| 7,006,077 B1 * | 2/2006 | Uusimaki | 345/173 |
| 7,030,861 B1 * | 4/2006 | Westerman et al. | 345/173 |

(Continued)

FOREIGN PATENT DOCUMENTS
EP 0 330 767 B1 10/1993

OTHER PUBLICATIONS

Carlson, Jeff. Visual Quickstart Guide Palm Organizers. Peachpit Press. 2000. Berkeley, CA. Pages xiii, 12, 25, 26, 28-30, 40, 47, 246 and 253.*

(Continued)

Primary Examiner — Ryan Pitaro
(74) Attorney, Agent, or Firm — Soquel Group LLC

(57) ABSTRACT

The present invention relates to a user interface for a mobile handheld computer unit, which computer unit comprises a touch sensitive area (1), which is divided into a menu area (2) and a display area (3). The computer unit is adapted to run several applications simultaneously and to present an active application on top of any other application on the display area (3). The menu area (2) is adapted to present a representation of a first (21), a second (22) and a third predefined (23) function. The first function (21) is a general application dependent function, the second function (22) is a keyboard function, and the third function (23) is a task and file manager. Any one of these three functions can be activated when the touch sensitive area (1) detects a movement of an object with its starting point within the representation of the function on the menu area (2) and with a direction from the menu area (2) to the display area (3).

17 Claims, 4 Drawing Sheets

U.S. PATENT DOCUMENTS

| | | | |
|---|---|---|---|
| 7,159,763 B2 * | 1/2007 | Yap et al. | 235/375 |
| 7,225,408 B2 * | 5/2007 | O'Rourke | 715/743 |
| 7,286,063 B2 * | 10/2007 | Gauthey et al. | 341/34 |
| 7,880,724 B2 * | 2/2011 | Nguyen et al. | 345/168 |
| 2001/0002694 A1 | 6/2001 | Nakazawa et al. | |
| 2001/0022579 A1 | 9/2001 | Hirabayashi | |
| 2001/0026268 A1 | 10/2001 | Ito | |
| 2001/0028344 A1 | 10/2001 | Iwamoto et al. | |
| 2001/0055006 A1 | 12/2001 | Sano et al. | |
| 2002/0002326 A1 * | 1/2002 | Causey et al. | 600/300 |
| 2002/0027549 A1 * | 3/2002 | Hirshberg | 345/168 |
| 2002/0046353 A1 * | 4/2002 | Kishimoto | 713/202 |
| 2002/0171691 A1 * | 11/2002 | Currans et al. | 345/864 |
| 2004/0021643 A1 * | 2/2004 | Hoshino et al. | 345/173 |
| 2004/0100510 A1 * | 5/2004 | Milic-Frayling et al. | 345/864 |
| 2005/0035956 A1 * | 2/2005 | Sinclair et al. | 345/184 |

OTHER PUBLICATIONS

Strietelmeier, Julie. "Palm m100." The Gadgeteer. 2000. <http://www.the-gadgeteer.com/review/palm_m100_review> pp. 1-8.*

Venolia et al, T-Cube: A Fast, Self-Disclosing Pen-Based Alphabet, Apr. 24, 1994, pp. 265-270.*

Venoila et al, T-Cube: A Fast, Self Disclosing Pen-Based Alphabet, 1994, pp. 265-270.*

Karlson et al, AppLens and LaunchTile:Two Designs for One-Handed Thumb Use on Small Devices, CHI 2005.*

Dulberg et al, An Imprecise Mouse Gesture for the FAst Activation of Controls, Interact 1999, pp. 1-8.*

Rogue, Palm Pilot: The Ultimate Guide, 2nd Edition,1998, O'Reilly and Associates, Inc. pp. 1-17.*

* cited by examiner

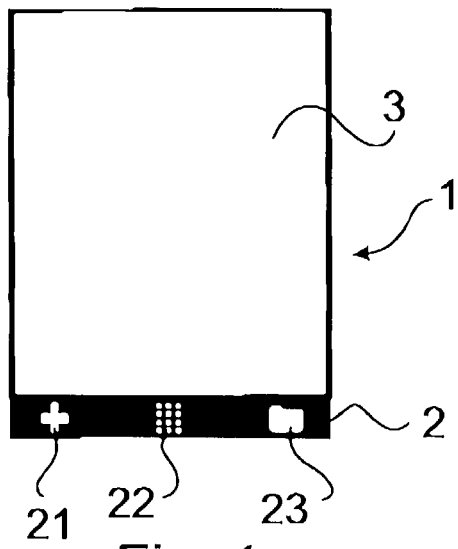
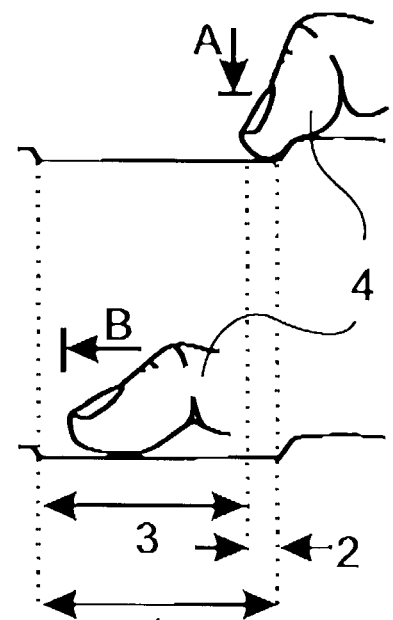
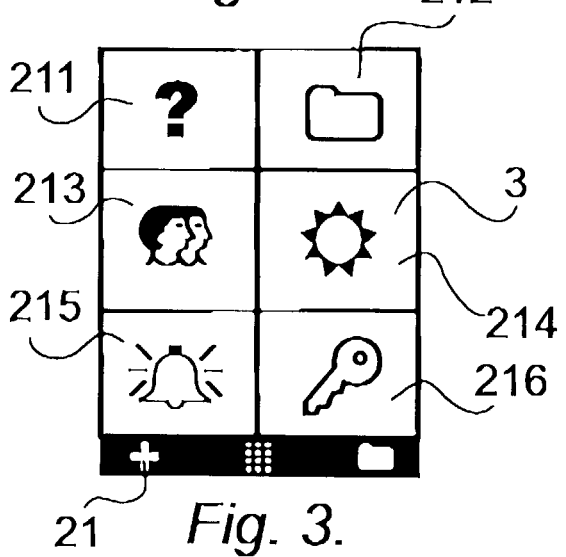
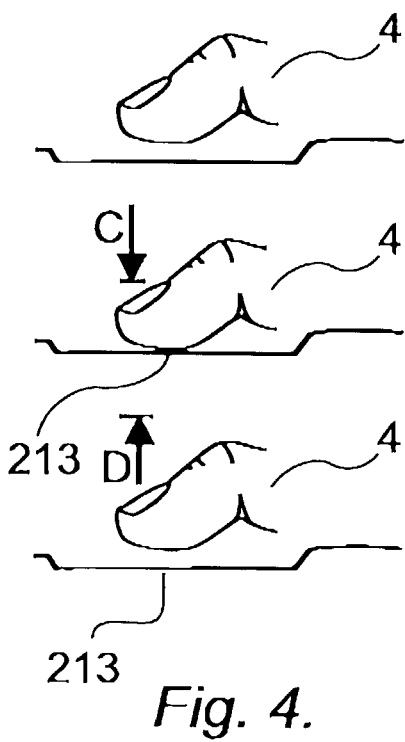
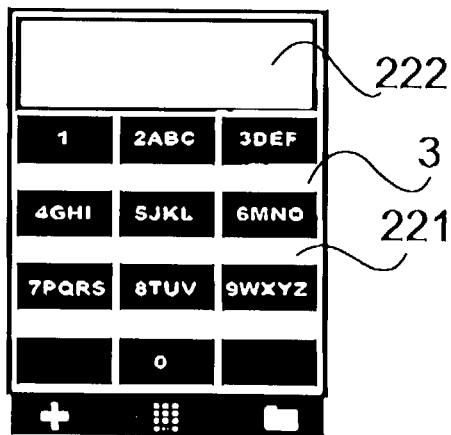

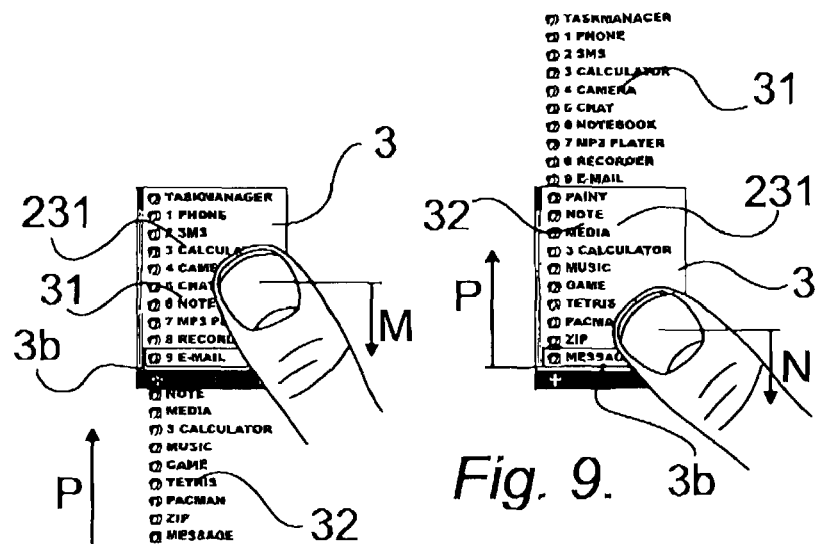
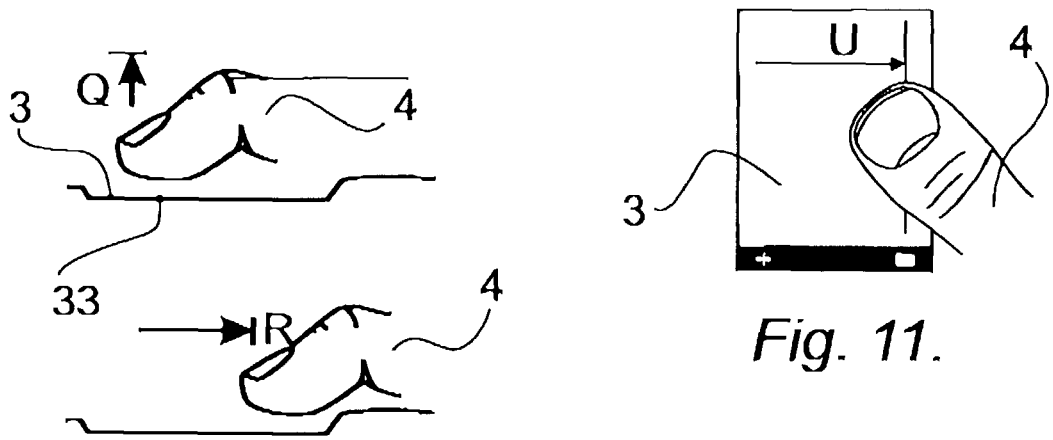
Fig. 10.
Fig. 11.
Fig. 12.

USER INTERFACE FOR MOBILE HANDHELD COMPUTER UNIT

TECHNICAL FIELD

The present invention relates to a user interface for a mobile handheld computer unit, which computer unit comprises a touch sensitive area, and which touch sensitive area is divided into a menu area and a display area.

The computer unit is adapted to run several applications simultaneously and to present any active application on top of any other application on the display area.

The present invention also relates to an enclosure for a handheld computer unit.

The present invention also relates to a computer readable medium. A computer program product with computer program code is stored within the computer readable medium, which code, when read by a computer, will make it possible for this computer to present a user interface according to the invention.

DESCRIPTION OF BACKGROUND ART

Mobile handheld computers are known in various embodiments. One kind of handheld computer is the personal digital assistant (PDA), which is getting more and more powerful.

Another kind of handheld computer unit is the mobile phone, which also is getting more and more powerful. There are also examples of where the mobile phone and the PDA are merging into one unit.

A third kind of handheld computer is the laptop computer, which is getting smaller and smaller, even competing in size with the PDA's.

The need to manage more information has led the development towards new solutions regarding user interfaces and navigation. The PDA's and mobile phones are getting larger and larger in order to provide a user-friendly interface.

Since the users have gotten used to small handheld units, it is hard to move towards larger units. This has led to foldable keyboards, different kinds of joy sticks and different kinds of touch sensitive displays and pads intended to help in providing a user interface that is suitable for small handheld computer units.

SUMMARY OF THE PRESENT INVENTION

Technical Problems

It is a problem to provide a user-friendly interface that is adapted to handle a large amount of information and different kinds of traditional computer-related applications on a small handheld computer unit.

It is a problem to provide a user interface that is simple to use, even for inexperienced users of computers or handheld devices.

It is a problem to provide a small handheld computer unit with an easily accessible text input function.

It is also a problem to provide a simple way to make the most commonly used functions for navigation and management available in the environment of a small handheld computer unit.

Solution

Taking these problems into consideration, and with the staring point from a user interface for a mobile handheld computer unit, which computer unit comprises a touch sensitive area, which touch sensitive area is divided into a menu area and a display area, which computer unit is adapted to run several applications simultaneously and to present an active application on top of any other application on the display area, the present invention teaches that the menu area is adapted to present a representation of a first, a second and a third predefined function, where the first function is a general application dependent function, the second function is a keyboard function, and the third function is a task and file manager. The present invention also teaches that any one of these three functions can be activated when the touch sensitive area detects a movement of an object with its starting point within the representation of the function on the menu area and with a direction from the menu area to the display area.

With the purpose of providing a simple way of managing any application or the operations system, the present invention teaches that if the first function is activated, the display area is adapted to display icons representing services or settings, depending on the current active application. One of the icons always represents a "help"-service, regardless of application. The icons are adapted to represent services or settings of the operations system of said computer unit, such as background picture, clock, users, help, etc. if no application is currently active on the computer unit.

Selections of preferred service or setting is done by tapping on corresponding icon.

With the purpose of providing the access to a text input function in any application in the computer unit, the present invention teaches that when the second function is activated, the display area is adapted to display a keyboard and a text field, If a text passage in an active application is highlighted, then this text passage is displayed in the text field for editing through the keyboard and that the highlighted text passage is replaced by the edited text passage when the second function is deactivated.

If no text passage in an active application is highlighted, then the text field is available for inputting and editing of text through the keyboard.

In the case of the latter the first function can be activated, or the second function can be closed, in which a choice of saving or deleting the inputted text is given. The choice of saving the inputted text results in an activation of the first function. In this case the first function will present services or settings available for the inputted text, such as saving the inputted text for later use, using the inputted text as telephone number in a telephone application, or sending the inputted text as message in communications application.

In order to provide a task and file management in a user interface for a handheld mobile computer, the present invention teaches that, if the third function is activated, the display area is adapted to display a list with a library of available applications and files on the computer unit. A selection of an application will start the application, and a selection of a file will open the file in an application intended for the file.

A selection of an application or a file is done by moving the object so that the representation of desired application or file is highlighted, removing the object from the touch sensitive area, and then tapping on the touch sensitive area.

According to the present invention a navigation in the list is performed by moving the object in a direction towards the top of the list or towards the bottom of the list. This will cause the marking to move in the same direction. The speed of the movement of the marking is lower than the speed of the movement of the object, with the purpose of making the navigation easier.

The user interface of the present invention is specifically adapted to be used with a small computer unit where the size of the touch sensitive area is in the order of 2-3 inches, The user interface is also adapted to be operated by one hand, where the object can be a finger, such as the thumb, of a user of the computer unit.

Advantages

Those advantages that can be primarily associated with a user interface or a computer readable medium according to the present invention reside in the ability to establish a user-friendly interface for small handheld computers, both regarding general application set-up functions, text input functions, and file and task management.

BRIEF DESCRIPTION OF THE DRAWINGS

The present invention will now be described in more detail with reference to the accompanying drawings, in which FIG. 1 is a schematic and highly simplified view of a touch sensitive area on a mobile handheld computer unit;

FIG. 2 is a schematic side view illustrating the activation of a function;

FIG. 3 is a schematic illustration of a first function;

FIG. 4 is a schematic side view illustrating the selection of a service or setting represented by an icon;

FIG. 5 is a schematic illustration of a second function;

FIG. 9 is a schematic illustration of how the content of the display are is changed;

FIG. 10 is a schematic side view further illustrating how navigation is performed;

FIG. 11 is a schematic illustration of moving forwards in an application;

FIG. 12 is a schematic illustration of moving backwards in, or closing, an application;

DESCRIPTION OF EMBODIMENTS AT PRESENT PREFERRED

Figure 6:
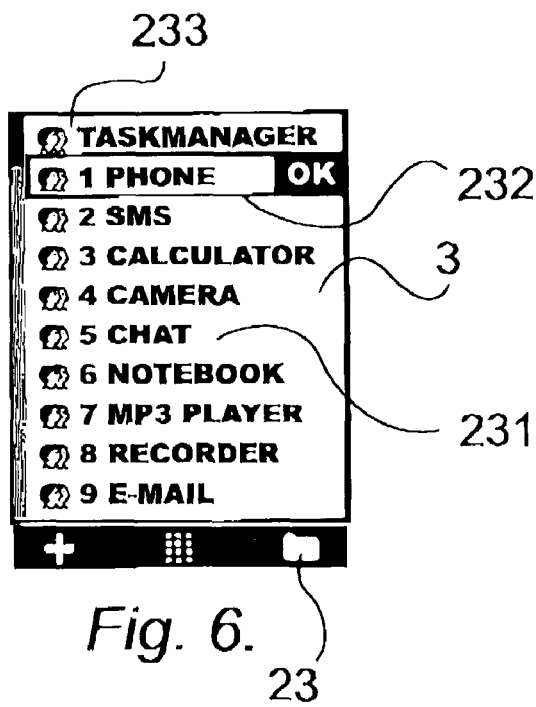
FIG. 6 is a schematic side view illustrating the selection of a third function.

FIG. 1 illustrates a user interface for a mobile handheld computer unit. The user interface according to the present invention is specifically adapted to computer units comprising a touch sensitive area 1, which is divided into a menu area 2 and a display area 3. It should be understood that there are several different kinds of known touch sensitive displays and that the present invention does not depend on what kind of touch sensitive display that is used in relation to the inventive user interface.

The computer unit is adapted to run several applications simultaneously and to present an active application on top of any other application on the display area 3. It should be understood that by simultaneously it is meant any technology that will make it appear to a user of the computer unit that applications are run simultaneously and that the present invention does not depend on how this is realised, whether it is through time-sharing of one processor, parallel use of several processors, or any other technique.

According to the present invention the menu area 2 is adapted to present a representation of a first 21, a second 22 and a third 23 predefined function.

The first function 21 is a general application dependent function, the second function 22 is a keyboard function, and the third function 23 is a task and file manager.

FIG. 2 shows that any one of these three functions 21, 22, 23 can be activated when the touch sensitive area 1 detects a movement of an object 4 with its starting point A within the representation of a function on the menu area 2 and with a direction B from the menu area 2 to the display area 3.

FIG. 3 shows that if the first function 21 is activated, then the display area 3 is adapted to display icons 211, 212, 213, 214, 215, 216 representing services or functions depending on the current active application. One of the icons, in the figure exemplified by icon 211, always represents a "help"-service, regardless of application. Any key that, because of lack of space on the display area, or because the key should be hidden from the active application, or because of any other reason is not shown on the display area of an active application, can be represented by one of the icons 212, 213, 214, 215, 216 that is shown when the first function 21 is activated.

If for instance the active application handles a picture, then the icons that are shown when the first function is activated can be services such as "save to disk", "send as SMS", or "delete" and they can be settings such as "resolution", "colour", or "brightness".

If no application is currently active on the computer unit, then the icons 211, 212, 213, 214, 215, 216 are adapted to represent services or settings of the operations system of the computer unit, such as background picture, clock, alarm 215, users 213, help 211, etc.

FIG. 4 shows that selection of a preferred service or setting is done by tapping C, D on corresponding icon 213.

FIG. 5 shows that if the second function 22 is activated, then the display area 3 is adapted to display a keyboard 221 and a text field 222.

Two different scenarios can be at hand when this function key is activated. A first scenario can be that a text passage in the active application is highlighted as the second function is activated. If this is the case then the highlighted text passage is displayed in the text field 222 for editing through the keyboard 221.

The highlighted text passage is replaced by the edited text passage when the second function 21 is deactivated.

A second scenario can be that no text passage in the active application is highlighted. If this is the case then the text field 222 is available for inputting and editing of text through the keyboard 221.

In the case of the latter scenario, the first function 21 can be activated, or the second function 22 can be closed. If the second function 22 is closed then a choice of saving or deleting the inputted text is given, where the choice of saving the inputted text results in an activation of the first function 21.

As the first function 21 is activated with the second function 22 as currently active application the first function 21 will present services or settings available for the inputted text, such as saving the inputted text for later use, using the inputted text as telephone number in a telephone application, or sending the inputted text as message in communications application, such as e-mail, SMS, or fax.

FIG. 6 shows that if the third function 23 is activated, then the display area 3 is adapted to display a list 231 with a library of available applications and files on the computer unit.

A selection of an application will start the application, and a selection of a file will open the file in an application intended for the file. The name of a selected file can be edited by activation of the second function 22 as the file is highlighted.

Figure 7:
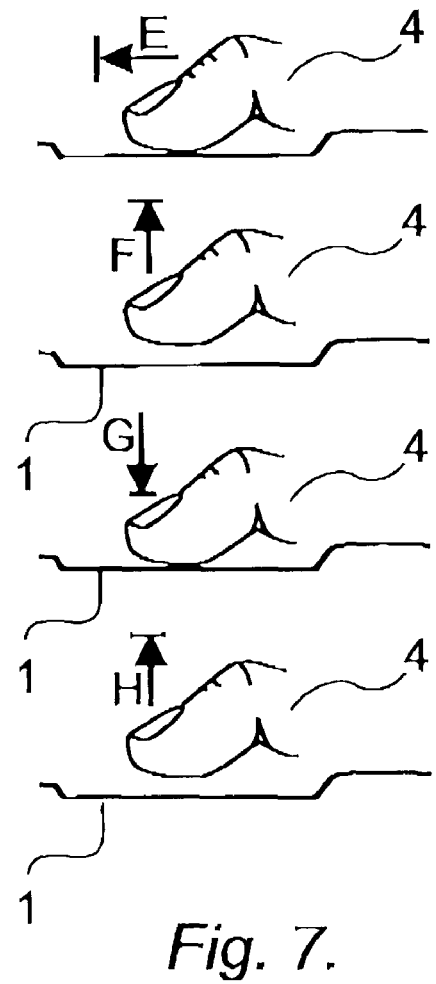
FIG. 7 is a schematic illustration of an application or file.

FIG. 7 shows that a selection of an application or a file is done by moving E the object 4 so that the representation of desired application or file is highlighted, removing F the object 4 from the touch sensitive area 1, and then tapping G, H on the touch sensitive area 1.

An application or file is highlighted by placing some kind of marking 232 on the representation of the application or file. This marking can be done in different ways, for example by putting a frame around the representation of the application or file, as shown in the figure, or by inverting the representation of the application or file.

It should be understood that all lists in the computer unit, such as a list of contact information in an address book, a list of e-mail messages in a mailbox, or a telephone log, can be managed in the above described manner.

The list 231 can be adapted to present only files or only applications. In this case, the top area of the list 231 can present a field 233 through which the content of the list 231 can be altered. If the list only presents files, then the field 233 can display a representation of a task manager and a selection of the field 233 will cause the list 231 to after to present only applications, and if the list 231 only presents applications, then the field 233 displays a representation of a file manager and a selection of the field 233 will cause the list 231 to after and present only files.

Figure 8:
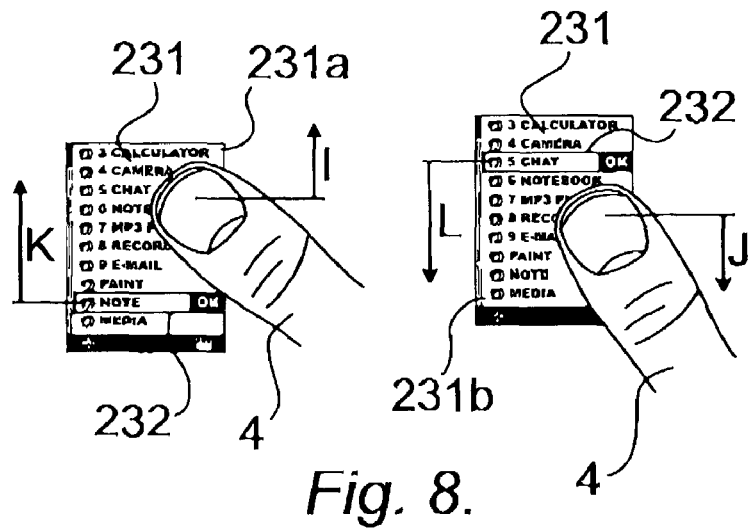
FIG. 8 is a schematic illustration on how navigation is performed.

FIG. 8 shows that navigation in the list is performed by moving the object 4 in a direction I towards the top 231a of the list 231 or towards J the bottom 231b of the list 231. This movement I, J of the object 4 will cause the marking 232 to move K, L in the same direction. The speed of the movement K, L of the marking 232 is lower than the speed of the movement I, J of the object 4.

FIG. 9 shows that if the number of applications and/or files in the list 231 exceeds the number of applications and/or files that can be presented on the display area 3, and if the object 4 is moved to the top or bottom position of the display area, then lifted, replaced on the display area, and then again moved to the top or bottom of the display area, then the content of the display area will be replaced one whole page, meaning that if the object 4 is positioned N at the bottom 3b of the display area 3, then lifted, replaced on the display area 3, and then again moved M to the bottom 3b of the display area 3, then the content 31 of the display area 3 will be replaced P by the following applications and/or files 32 in the list 231. In the same way, but not shown in the figure, if the object is positioned at the top of the display area, then lifted, replaced on the display area 3, and then again moved to the top of the display area, the content of the display area will be replaced by the preceding applications and/or files in the list.

FIG. 10 shows that if the object 4 is removed Q from a first position 33 on the display area 3 and then replaced R, S on a second position 34 on the display area 3, then the navigation can be continued T from the second position 34.

FIG. 11 shows that moving U the object 4 from the left of the display area 3 to the right of the display area 3 moves the active application, function, service or setting on one step forwards. FIG. 12 shows that, in a similar manner, the active application, function, service or setting is closed or backed one step by moving V the object 4 from the right of the display area 3 to the left of the display area 3.

As shown in FIG. 1, the menu area 2 is positioned at the bottom of the touch sensitive area 1. The representation of the first function 21 is positioned at the left side of the menu area 2, the representation of the second function 22 is positioned at the middle of the menu area 2, and the representation of the third function 23 is positioned at the right side of the menu area 2.

Figure 13:
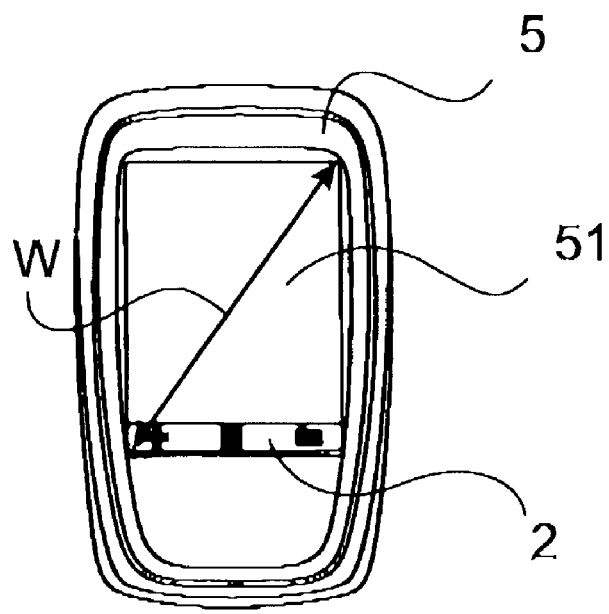
FIG. 13 is a schematic illustration of an enclosure

As shown in FIG. 13, the present invention relates to a user interface for a hand held mobile unit that preferably can be manageable with one hand. Hence the present invention teaches that the user interface is adapted to a touch sensitive area 1 with a size that is in the order of 2-3 inches, meaning the diagonal distance W between two corners of the touch sensitive area 1.

The user interface is adapted to be operated by one hand, where the object 4 can be a finger, such as the thumb shown in the figures, of a user of the computer unit. It should be understood though that the present invention might also be used with another object, such as a pen or other pointing device.

According to one preferred embodiment of the present invention the computer unit is covered with an enclosure 5, which is provided with an opening 51 for the display area 3, and where the representations of the menu area 2 is printed on top of the enclosure 5. It should be understood that the opening 51 might be a transparent part of the enclosure 5 or that it might be an open aperture depending on among other things technical considerations pertaining to the touch sensitive area 1.

This makes it possible to allow the enclosure 5 to be removable and exchangeable.

Figure 14:
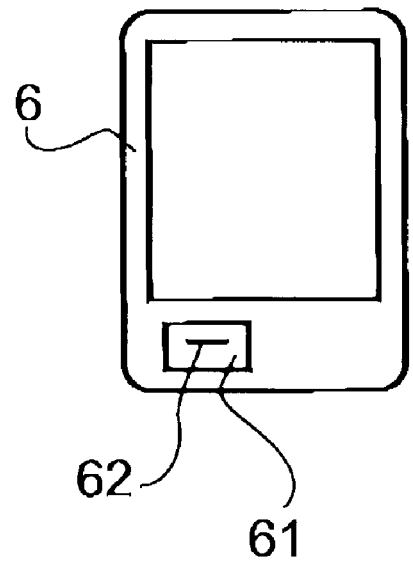
FIG. 14 shows a computer readable medium in the form of a solid state memory.

FIG. 14 shows a computer readable medium, in the figure schematically shown as a solid-state memory 61. A computer program product is stored within the computer readable medium. This computer program product comprises computer readable code 62, which, when read by a computer 6, will make it possible for the computer 6 to present a user interface according to the present invention.

The present invention also teaches that the computer program product is adapted to function as a shell upon an operations system.

It will be understood that the invention is not restricted to the aforedescribed and illustrated exemplifying embodiments thereof, and that these embodiments can be modified within the scope of the inventive concept illustrated in the accompanying Claims.

The invention claimed is:

1. A non-transitory computer readable medium storing a computer program with computer program code, which, when read by a mobile handheld computer unit, allows the computer to present a user interface for the mobile handheld computer unit, the user interface comprising:
   a touch sensitive area in which a representation of a function is provided, wherein the representation consists of only one option for activating the function and wherein the function is activated by a multi-step operation comprising (i) an object touching the touch sensitive area at a location where the representation is provided and then (ii) the object gliding along the touch sensitive area away from the touched location, wherein the representation of the function is not relocated or duplicated during the gliding.

2. The computer readable medium of claim 1, wherein the function, when activated, causes the user interface to display icons representing different services or settings for a currently active application.

3. The computer readable medium of claim 2, wherein the user interface is characterised in, that a selection of a preferred service or setting is done by tapping on a display icon corresponding to the preferred service or setting.

4. The computer readable medium of claim 1, wherein the function, when activated, causes the user interface to display a keyboard and a text field.

5. The computer readable medium of claim 4, wherein said text field is used for inputting and editing of text through said keyboard.

6. The computer readable medium of claim 1, wherein the function, when activated, causes the user interface to display a list with a library of available applications and files on the mobile handheld computer unit.

7. The computer readable medium of claim 6, wherein the user interface is characterised in, that a selection of an application or file is done by gliding the object along said touch sensitive area so that a representation of a desired one of said application or file is highlighted, raising said object from said touch sensitive area, and then tapping on said touch sensitive area.

8. The computer readable medium of claim 7, wherein the user interface is characterised in, that at any given time said list presents only files or only applications, and that an area of said list presents a field through which said list can be changed from presenting files to presenting applications, or from presenting applications to presenting files.

9. The computer readable medium of claim 7, wherein the user interface is characterised in, that, one item in said list is highlighted by a moveable marking, and the user interface enables list navigation whereby gliding the object along the touch sensitive area in a direction towards the top of said list or towards the bottom of said list causes said marking to move in the same direction without scrolling the list.

10. The computer readable medium of claim 9, wherein the user interface is characterised in, that, if the number of applications or files in said list exceeds the number of applications or files that can be presented on said touch sensitive area as content, and if the object is (i) glided along said touch sensitive area to the top or bottom of said touch sensitive area, then (ii) raised above said touch sensitive area, then (iii) replaced on said touch sensitive area, and then (iv) again glided along said touch sensitive area to the top or bottom of said touch sensitive area, said list navigation pages the content of said list up or down by one whole page.

11. The computer readable medium of claim 10, wherein the user interface is characterised in, that if the object is raised from any first position on said touch sensitive area and then replaced on any second position on said touch sensitive area, said list navigation can be continued from said second position.

12. The computer readable medium of claim 1, wherein the user interface is characterised in, that an active application, function, service or setting is advanced one step by gliding the object along the touch sensitive area from left to right, and that the active application, function, service or setting is closed or backed one step by gliding the object along the touch sensitive area from right to left.

13. The computer readable medium of claim 1, wherein the user interface is characterised in, that said representation of said function is located at the bottom of said touch sensitive area.

14. The computer readable medium of claim 1, wherein the touch sensitive area is 2-3 inches in diagonal dimension.

15. The computer readable medium of claim 1, characterised in, that said computer program code is adapted to function as a shell upon an operating system.

16. The computer readable medium of claim 1, wherein the representation is finger-sized.

17. The computer readable medium of claim 1, wherein the location where the representation is provided does not provide touch functionality for a different function.

\* \* \* \* \*